United States Patent
Ishikawa

(10) Patent No.: US 11,330,248 B2
(45) Date of Patent: May 10, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Rei Ishikawa, Wako (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 16/798,206

(22) Filed: Feb. 21, 2020

(65) Prior Publication Data
US 2020/0275086 A1  Aug. 27, 2020

(30) Foreign Application Priority Data

Feb. 27, 2019  (JP) .............................. JP2019-034685

(51) Int. Cl.
| | | |
|---|---|---|
| *H04N 13/296* | (2018.01) | |
| *H04N 13/282* | (2018.01) | |
| *H04N 13/279* | (2018.01) | |

(52) U.S. Cl.
CPC ......... *H04N 13/296* (2018.05); *H04N 13/279* (2018.05); *H04N 13/282* (2018.05)

(58) Field of Classification Search
CPC .. H04N 13/279; H04N 13/282; H04N 13/296; H04N 5/232; H04N 5/247
See application file for complete search history.

(56) References Cited

U.S. PATENT DOCUMENTS

| | | | | |
|---|---|---|---|---|
| 10,284,753 | B1* | 5/2019 | Naik | G06T 7/596 |
| 2005/0219239 | A1* | 10/2005 | Mashitani | H04N 13/275 |
| | | | | 345/419 |
| 2017/0024934 | A1* | 1/2017 | Numaguchi | A63F 13/65 |
| 2017/0220105 | A1* | 8/2017 | Ogata | G06F 3/012 |
| 2018/0063514 | A1* | 3/2018 | Mizuno | G06F 3/147 |
| 2018/0160049 | A1* | 6/2018 | Aizawa | H04N 5/247 |
| 2018/0184072 | A1* | 6/2018 | Yoshimura | G06T 7/248 |
| 2018/0352215 | A1* | 12/2018 | Iwakiri | H04N 13/117 |
| 2018/0359457 | A1* | 12/2018 | Morisawa | H04N 13/128 |
| 2018/0359458 | A1* | 12/2018 | Iwakiri | G06T 15/205 |
| 2019/0005732 | A1* | 1/2019 | Satake | G06K 9/00288 |
| 2019/0041974 | A1* | 2/2019 | Matsuike | G06F 3/017 |
| 2020/0084431 | A1* | 3/2020 | Kato | G06T 15/20 |

FOREIGN PATENT DOCUMENTS

JP  2012-252468 A  12/2012

* cited by examiner

*Primary Examiner* — Anner N Holder
(74) *Attorney, Agent, or Firm* — Canon U.S.A., Inc. IP Division

(57) ABSTRACT

An information processing apparatus includes a setting unit configured to set a movement parameter indicating a relationship between a movement amount in a real space of an input apparatus used for moving a virtual viewpoint corresponding to a virtual viewpoint image, and a movement amount of a virtual viewpoint in a virtual space, based on a user operation, and a movement control unit configured to move, in accordance with a movement of the input apparatus, the virtual viewpoint by a movement amount in the virtual space that is determined based on the movement parameter set by the setting unit and a movement amount in the real space of the input apparatus.

14 Claims, 10 Drawing Sheets

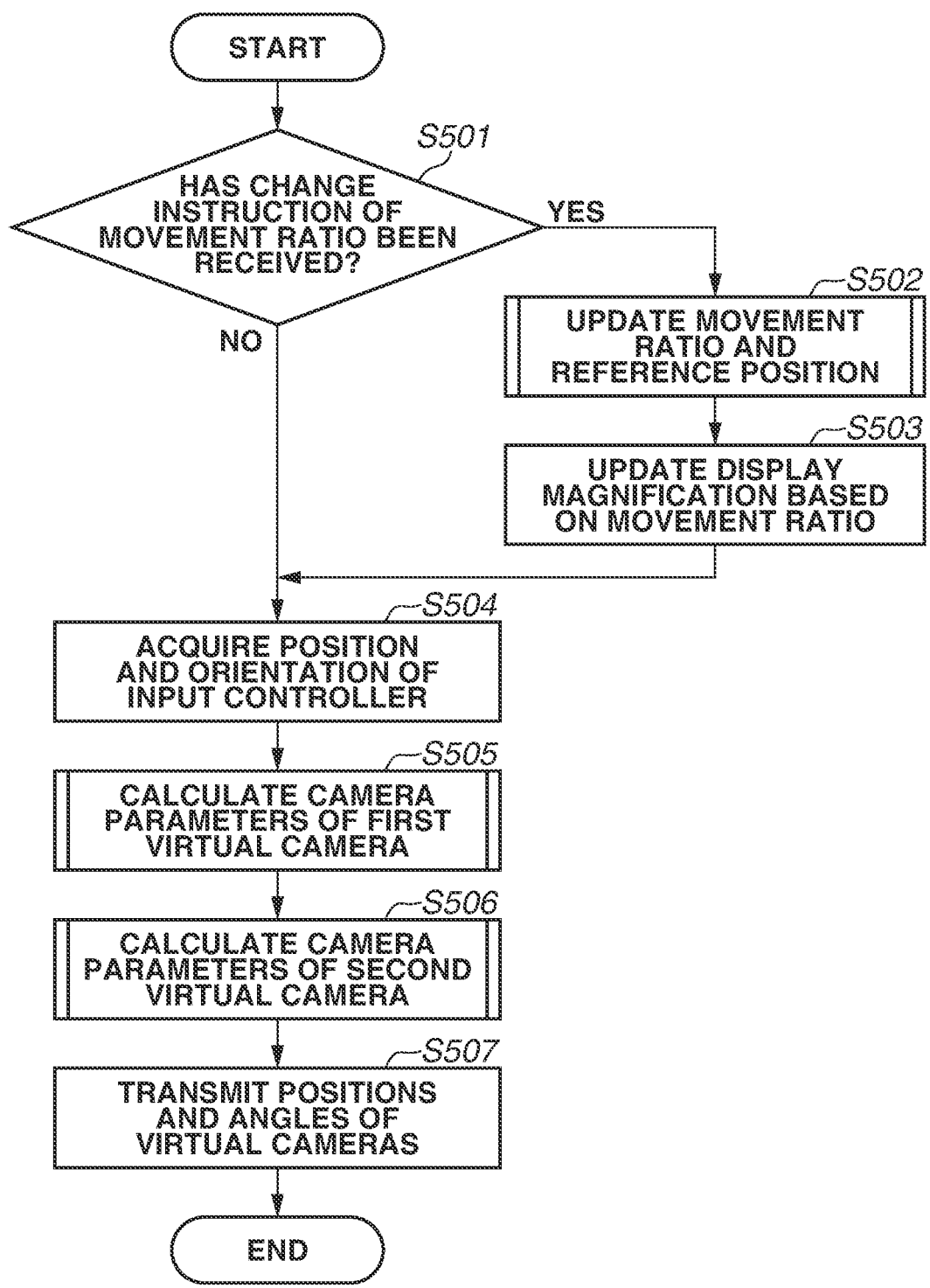

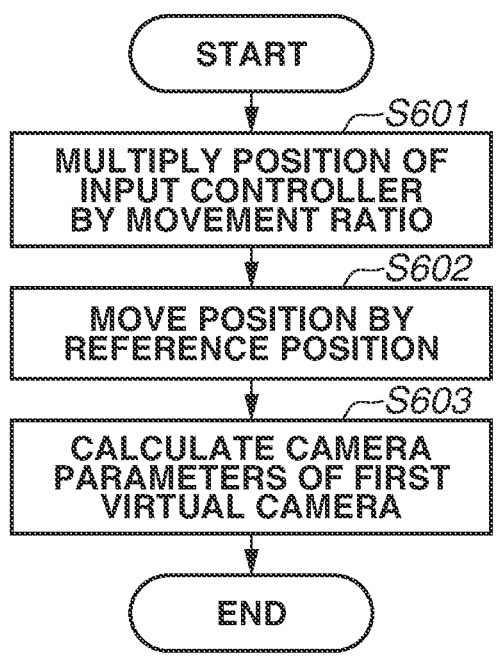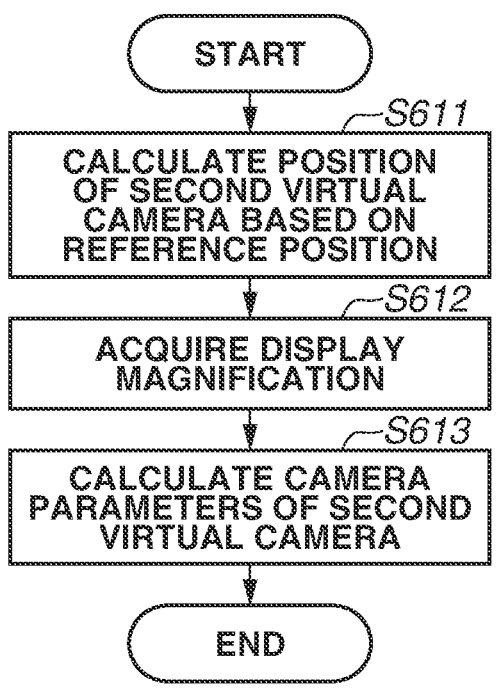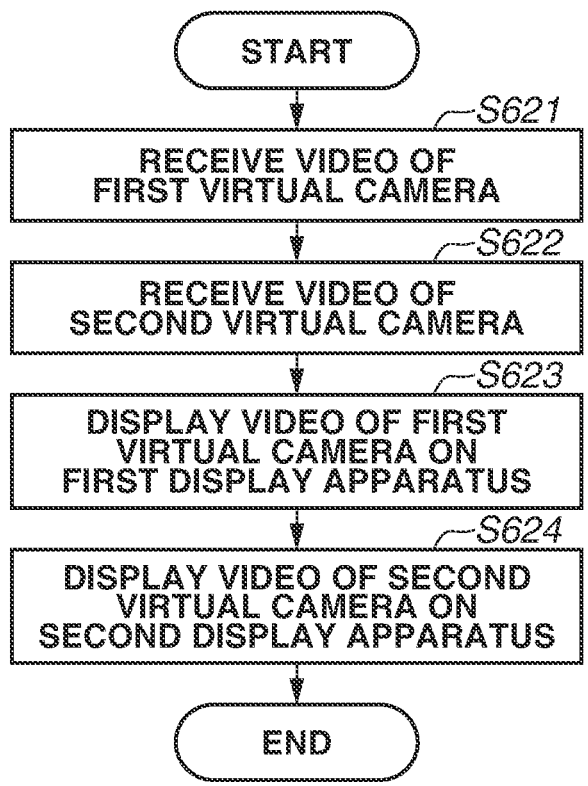

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

In recent years, there has been a technique of performing multi-view synchronized image capturing by installing cameras serving as a plurality of imaging apparatuses at different positions, and generating not only images from camera installation positions but also a virtual viewpoint image from an arbitrary viewpoint using captured images.

In generating and viewing a virtual viewpoint image that is based on images captured from a plurality of viewpoints, images captured by a plurality of cameras are gathered to an image processing unit such as a server. Then, the image processing unit performs processing such as rendering that is based on a virtual viewpoint, and displays a virtual viewpoint image on a user terminal.

As described above, in a service that uses a virtual viewpoint image, for example, a content creator can create content from a dynamic viewpoint based on a captured image of a match of soccer or basketball. In addition, a user viewing the content can watch the match while freely moving a viewpoint, and high realistic sensation can be given to the user as compared with conventional captured images.

In accordance with the movement of a player or a ball in a scene of a match, a video creator designates a position and an orientation of a virtual viewpoint most appropriate for presenting the scene as a dynamic video. As one of methods of controlling a virtual viewpoint, there is a method of detecting a position and an orientation of a predetermined apparatus, and controlling a position and an orientation of a virtual viewpoint using the detected position and orientation. By such a method, a content creator can regard the predetermined apparatus as a virtual camera corresponding to the virtual viewpoint, and control the position and the orientation of the virtual viewpoint by changing the position and the orientation of the apparatus. Japanese Patent Application Laid-Open No. 2012-252468 discusses a technique of controlling a virtual viewpoint image to be displayed on a display apparatus, in accordance with the position and the orientation of the display apparatus.

In the case of moving a virtual viewpoint in accordance with the movement of an input apparatus used in the control of a virtual viewpoint, in some situation, it can be difficult to move the virtual viewpoint by a desired distance. For example, when the user moves the input apparatus in a real space such as a room having a limited space, and the virtual viewpoint is to be moved in a virtual space by an amount that is the same as the movement amount of the input apparatus, the virtual viewpoint cannot be moved by a long distance.

SUMMARY

According to an aspect of the present disclosure, an information processing apparatus includes a setting unit configured to set a movement parameter indicating a relationship between a movement amount in a real space of an input apparatus used for moving a virtual viewpoint corresponding to a virtual viewpoint image, and a movement amount of a virtual viewpoint in a virtual space, based on a user operation, and a movement control unit configured to move, in accordance with a movement of the input apparatus, the virtual viewpoint by a movement amount in the virtual space that is determined based on the movement parameter set by the setting unit and a movement amount in the real space of the input apparatus.

Further features of the present disclosure will become apparent from the following description of exemplary embodiments with reference to the attached drawings.

BRIEF DESCRIPTION OF THE DRAWINGS

FIGS. 2A, 2B, and 2C are diagrams illustrating an example of an input controller and so on.

FIG. 5 is a flowchart illustrating an example of processing performed by the information processing apparatus.

FIGS. 6A, 6B, and 6C are flowcharts each illustrating an example of processing performed by the information processing apparatus.

FIGS. 10A and 10B are diagrams illustrating an example of an image to be displayed and the like.

DESCRIPTION OF THE EMBODIMENTS

Hereinafter, exemplary embodiments of the present disclosure will be described in detail with reference to the drawings.

Figure 1A:
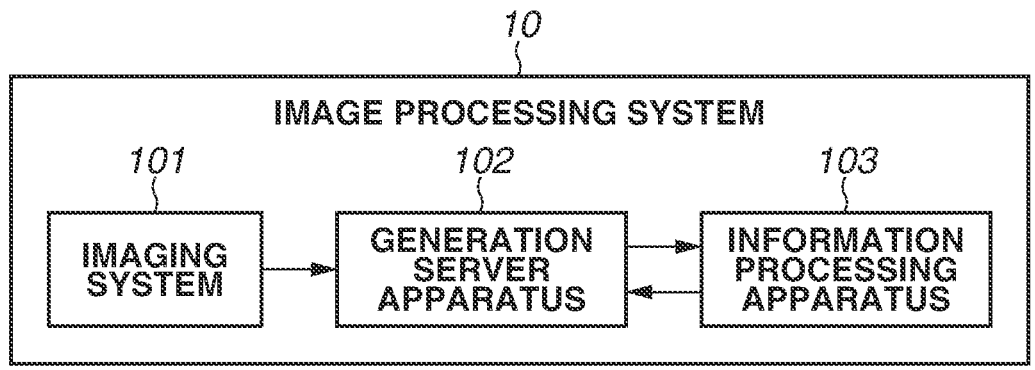
FIGS. 1A, 1B, and 1C are diagrams illustrating an example of a system configuration of an image processing system.

A first exemplary embodiment will be described. FIG. 1A is a diagram illustrating an example of a system configuration of an image processing system 10.

The image processing system 10 is a system that generates a virtual viewpoint image. The image processing system 10 includes an imaging system 101, a generation server apparatus 102, an information processing apparatus 103, an input controller 201, a display apparatus 202 (first display apparatus), and a display apparatus 203 (second display apparatus).

The imaging system 101 is a system that captures a plurality of images in a synchronized manner using a plurality of cameras, and transmits the captured images to the generation server apparatus 102. The imaging system 101 includes a plurality of cameras arranged at mutually different positions, and a control apparatus that controls the plurality of cameras. The control apparatus controls the plurality of cameras to capture a plurality of images from multiple viewpoints in a synchronized manner. Then, the control apparatus transmits the plurality of images captured in a synchronized manner using the plurality of cameras, to the generation server apparatus 102.

The generation server apparatus 102 is an information processing apparatus such as a server apparatus that generates a virtual viewpoint image viewed from a virtual viewpoint, based on the plurality of images transmitted from the imaging system 101. The virtual viewpoint is an imaginary viewpoint. In the present exemplary embodiment, a virtual camera being an imaginary camera arranged at a virtual viewpoint is supposed. The virtual camera can freely move within a virtual space being an imaginary imaging space. The virtual space is an imaginary three-dimensional space associated with an imaging space (imaging region in the real space) in which image capturing is performed by a camera installed in the real space. Via the virtual camera, the image processing system 10 can capture an image viewed from a viewpoint different from that of any camera included in the imaging system 101, i.e., can capture a virtual viewpoint image, via the virtual camera. The image capturing performed by the virtual camera refers to the generation of a virtual viewpoint image viewed from the virtual camera that is performed by the generation server apparatus 102. The viewpoint of the virtual camera (virtual viewpoint) is identified based on a camera parameter determined by the information processing apparatus 103.

The generation server apparatus 102 sequentially generates virtual viewpoint images based on a set of a plurality of images captured in a synchronized manner and sequentially transmitted from the imaging system 101. The generation server apparatus 102 can generate a virtual viewpoint image as a live image. Hereinafter, a virtual viewpoint image generated as a live image will be referred to as a live virtual viewpoint image. The live virtual viewpoint image generated by the image processing system 10 is a virtual viewpoint image generated at a time considering processing delay in the imaging system 101 and the generation server apparatus 102, based on a time at a processing time point.

Furthermore, the generation server apparatus 102 stores, into a storage unit of the generation server apparatus 102, a database that records a set of a plurality of images captured in a synchronized manner and received from the imaging system 101. In addition, the generation server apparatus 102 can generate a past virtual viewpoint image from the recorded set of the plurality of images. Hereinafter, a virtual viewpoint image at a past time point will be referred to as a replay virtual viewpoint image. In other words, the replay virtual viewpoint image is a virtual viewpoint image that is based on an image captured by the imaging system 101 at an arbitrary past time.

Unless otherwise noted, in the following description, a word "image" includes both concepts of a moving image and a still image. In other words, the image processing system 10 can execute processing on both images and moving images.

The information processing apparatus 103 controls a virtual camera and determines camera parameters indicating imaging conditions of the virtual camera. The camera parameters include parameters indicating the position, the orientation, and the zoom of the virtual camera. In addition, the camera parameters may include a parameter indicating an imaging time.

In the present exemplary embodiment, the position of the virtual camera indicated by the camera parameters is represented by three-dimensional coordinates. More specifically, the position of the virtual camera indicated by the camera parameters is represented by coordinates of an orthogonal coordinate system including three axes of an x-axis, a y-axis, and a z-axis. In this case, the position designated by the camera parameters is represented by coordinates, and represented by parameters in three axes of the x-axis, the y-axis, and the z-axis. An origin of the coordinate system is at an arbitrary position set in the imaging space.

In the present exemplary embodiment, the orientation of the virtual camera indicated by the camera parameters is represented by angles corresponding to three axes of pan, tilt, and roll. In this case, the orientation of the virtual camera indicated by the camera parameters is represented by three parameters (angles) the respective rotational directions of pan, tilt, and roll.

In the present exemplary embodiment, the zoom of the virtual camera that is designated by the camera parameter is represented by a focal length, for example. The zoom and an imaging time are each represented by a parameter in one axis. Thus, the camera parameters of the virtual camera includes parameters in at least eight axes (position represented by parameters in three axes, orientation represented by parameters in three axes, zoom represented by a parameter in one axis, imaging time represented by a parameter in one axis). The information processing apparatus 103 can control the parameters in these eight axes.

In the present exemplary embodiment, the camera parameters includes the parameters in these eight axes. Nevertheless, as another example, the camera parameters may include a parameter in an axis other than these eight axes. Alternatively, the camera parameters may include only a part of the parameters in these eight axes.

The information processing apparatus 103 is an information processing apparatus that determines camera parameters of a virtual camera, and transmits the determined camera parameters to the generation server apparatus 102. In the present exemplary embodiment, the information processing apparatus 103 is a personal computer (PC). Nevertheless, as another example, the information processing apparatus 103 may be another information processing apparatus such as a server apparatus, a tablet apparatus, or a computer installed in the input controller 201. The generation server apparatus 102 generates a virtual viewpoint image based on the camera parameters received from the information processing apparatus 103, and transmits the generated virtual viewpoint image to the information processing apparatus 103. Next, the information processing apparatus 103 controls a display unit to display the received virtual viewpoint image, In the present exemplary embodiment, the generation server apparatus 102 is one information processing apparatus, and generates both of a live virtual viewpoint image and a replay virtual viewpoint image. Nevertheless, as another example, the generation server apparatus 102 may include two information processing apparatuses, and the respective information processing apparatuses may generate a live virtual viewpoint image and a replay virtual viewpoint image.

Figure 1B:
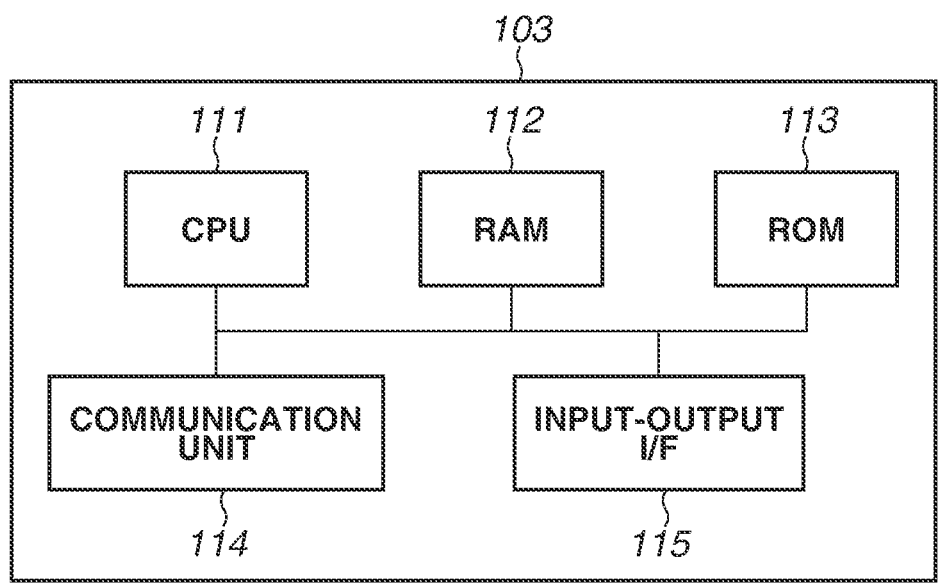

FIG. 1B is a diagram illustrating an example of a hardware configuration of the information processing apparatus 103.

The information processing apparatus 103 includes a central processing unit (CPU) 111, a random access memory (RAM) 112, a read only memory (ROM) 113, a communication unit 114, and an input-output interface (DT) 115. The components are connected via a system bus so as to communicate with each other.

The CPU 111 is a central processing unit that controls the entire information processing apparatus 103. The RAM 112 is a storage device that temporarily stores a computer program read from the ROM 113, a halfway result of calculation, and data supplied from the outside via the communication unit 114. The ROM 113 is a storage device that stores computer programs and data that need not be changed.

The communication unit 114 includes a communication unit compliant with Ethernet or a universal serial bus (USB), and communicates with an external apparatus such as the generation server apparatus 102. The input-output I/F 115 is an interface used for outputting and inputting information in a wired or wireless manner to and from an external device such as the input controller 201, the display apparatus 202, and the display apparatus 203, which will be described below with reference to FIGS. 1C, 2A, 2B, and 2C.

Figure 10A:
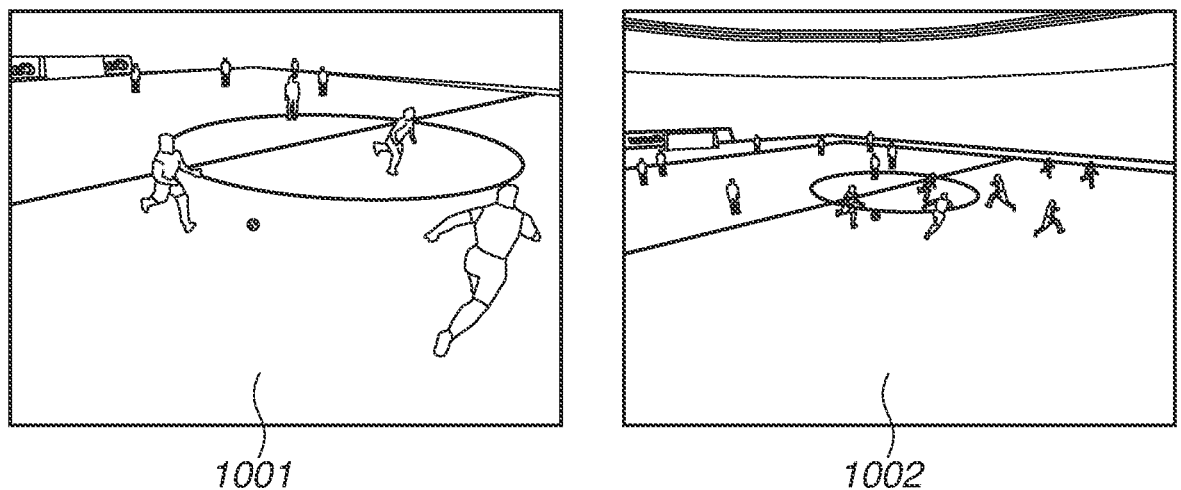
Figure 10B:
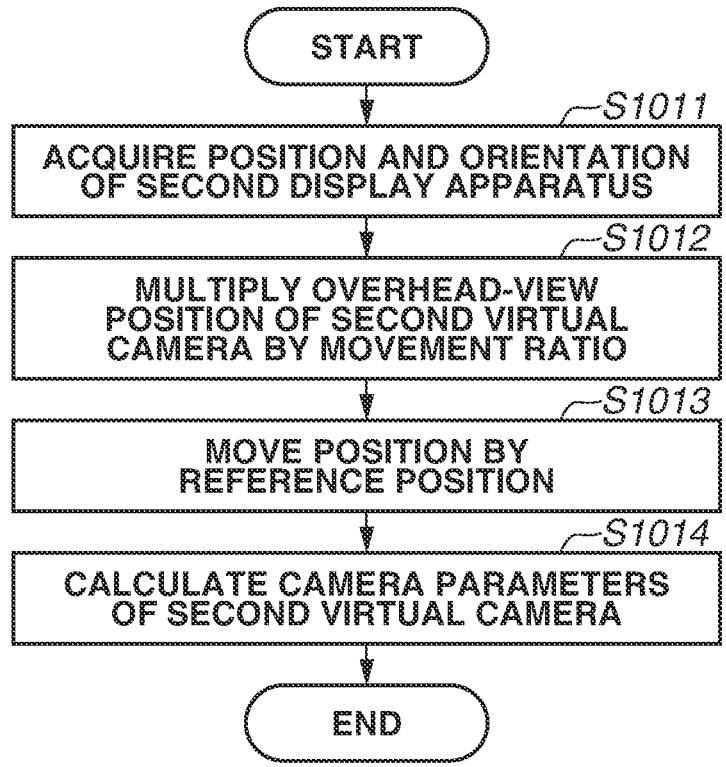

By the CPU 111 executing processing in accordance with programs stored in the ROM 113, functions of the information processing apparatus 103, which will be described below with reference to FIG. 3, and processing in flowcharts, which will be described below with reference to FIGS. 5, 6, and 10B, are implemented.

In the present exemplary embodiment, the control apparatus of the imaging system 101 and the generation server apparatus 102 each have a hardware configuration similar to the hardware configuration of the information processing apparatus 103 that is illustrated in FIG. 1B.

By a CPU of the control apparatus of the imaging system 101 executing processing in accordance with programs stored in a ROM of the control apparatus, functions of the control apparatus and processing of the control apparatus are implemented.

By a CPU of the generation server apparatus 102 executing processing in accordance with programs stored in a ROM of the generation server apparatus 102, functions of the generation server apparatus 102 and processing of the generation server apparatus 102 are implemented.

Figure 1C:
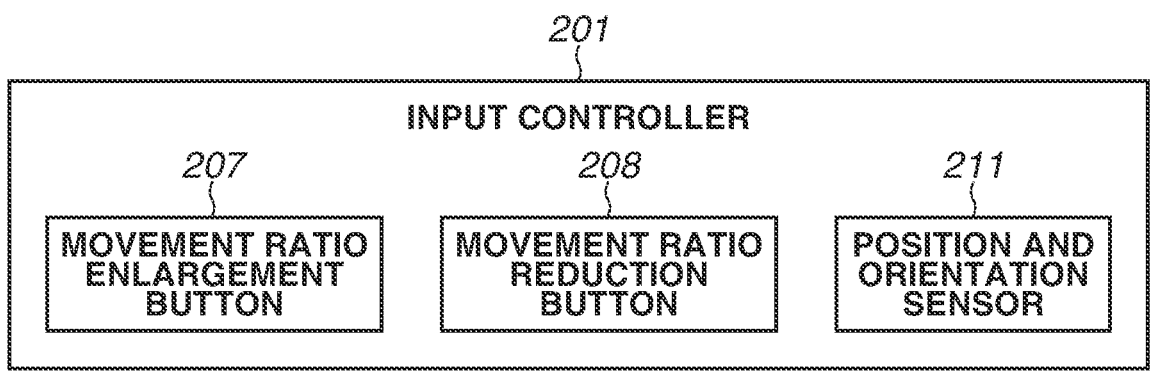

FIG. 1C is a diagram illustrating an example of a hardware configuration of the input controller 201. The input controller 201 is an input apparatus used for the control of a virtual viewpoint, and receives an operation for changing camera parameters of a virtual camera. In addition, the input controller 201 detects the position and the orientation of the input controller 201 in the real space.

In the present exemplary embodiment, by holding the input controller 201 and changing the position and the orientation thereof, the user can change the position and the orientation of a first virtual camera. The first virtual camera is a virtual camera of which the position and the orientation are controlled by the input controller 201. The position and the orientation indicate a concept encompassing a position and an orientation. In other words, in accordance with a change in the position and the orientation of the input controller 201, the information processing apparatus 103 changes the position and the orientation of the first virtual camera.

In the present exemplary embodiment, the input controller 201 detects a position in meters.

The input controller 201 includes an enlargement button 207, a reduction button 208, and a position and orientation sensor 211. The enlargement button 207 and the reduction button 208 are buttons used for a user operation for issuing a change instruction of a movement ratio. The movement ratio is a parameter indicating a movement amount by which the first virtual camera (virtual viewpoint) is to be moved in the virtual space, with respect to a movement amount of the input controller 201 in the real space. The movement ratio is an example of a movement parameter indicating a relationship between a movement amount of the input controller 201 and a movement amount of the first virtual camera (virtual viewpoint).

If the input controller 201 detects the selection of the enlargement button 207 or the reduction button 208, the input controller 201 transmits information indicating that the enlargement button 207 or the reduction button 208 has been selected, to the information processing apparatus 103, The information processing apparatus 103 receives the information transmitted from the input controller 201, via the input-output I/F 115. The information processing apparatus 103 changes a movement ratio in accordance with the reception of the information indicating that the enlargement button 207 or the reduction button 208 has been selected.

By changing the movement ratio, the information processing apparatus 103 can control a change amount of the position of the first virtual camera with respect to a change amount of the position of the input controller 201. At this time, a virtual viewpoint image captured by a second virtual camera also changes in accordance with the change in movement ratio. The second virtual camera is a virtual camera arranged at a position different from the first virtual camera, and captures a virtual viewpoint image for aiding in controlling the position and the orientation of the first virtual camera.

The input controller 201 detects the position and the orientation of the input controller 201 in the real space via the position and orientation sensor 211, and transmits information regarding the detected position and orientation of the input controller 201 to the information processing apparatus 103.

The display apparatus 202 is attached to the input controller 201, and displays a virtual viewpoint image captured by the first virtual camera. The display apparatus 202 is a display or a touch panel, By viewing the display apparatus 202, the user can check a virtual viewpoint image being captured by the user at the time at a processing time point.

The display apparatus 203 displays a virtual viewpoint image captured by the second virtual camera. In the present exemplary embodiment, the display apparatus 203 is a display installed on a floor, an apparatus including a screen installed on a floor and a projection apparatus that projects an image onto the screen, or the like. In the present exemplary embodiment, the second virtual camera is at such an orientation that an image of the surface of the ground can be captured from above the imaging space. Thus, an image of an overhead view looking down the imaging space from above is displayed on the display apparatus 203. By viewing the display apparatus 203, the user can check the surrounding situation of the position at which a first virtual camera is arranged.

Figure 2A:
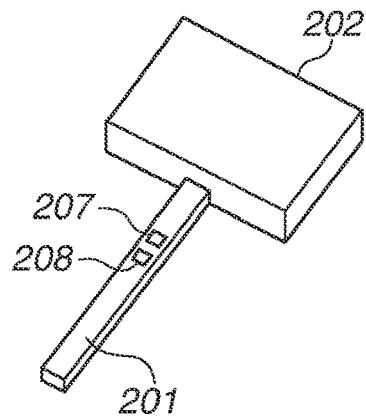

FIG. 2A is a diagram illustrating an example of external appearances of the input controller 201 and the display apparatus 202. FIG. 2A illustrates a state in which the display apparatus 202 is attached to the input controller 201.

Figure 2B:
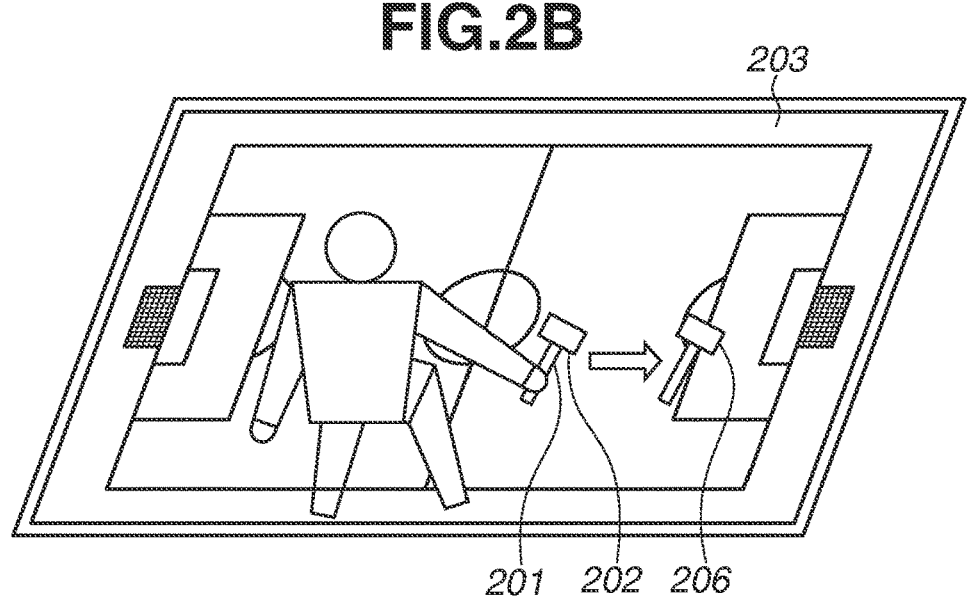

FIG. 2B is a diagram illustrating an example of a situation in which the display apparatus 203 is displaying an image. It can be seen that the display apparatus 203 is arranged with being embedded in the floor of an operation space.

Figure 2C:
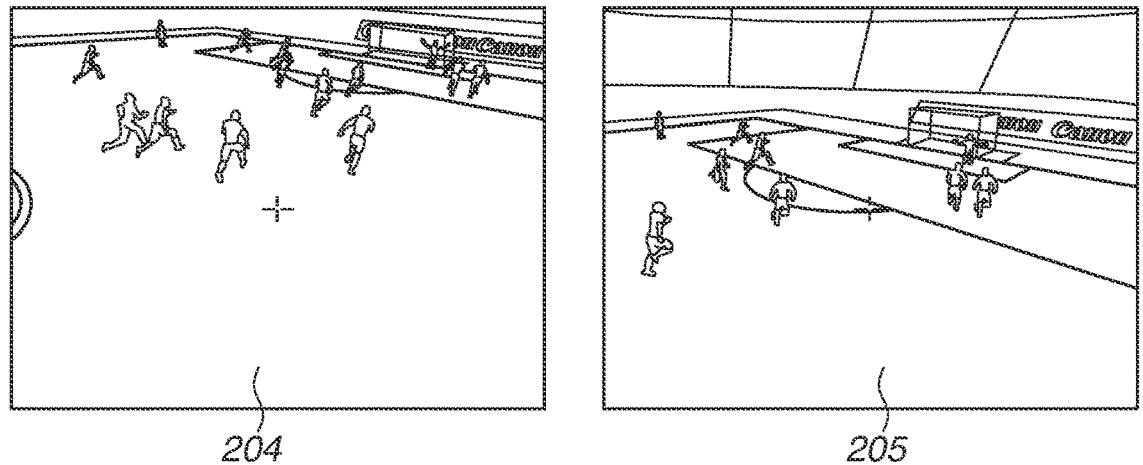

FIG. 2C is a diagram illustrating an example of a virtual viewpoint image captured by the first virtual camera and displayed on the display apparatus 202. An image 204 is an image displayed on the display apparatus 202 when the input controller 201 exists at the position illustrated in FIG. 2B.

The image 204 is a virtual viewpoint image captured by the first virtual camera at the position and orientation that correspond to the input controller 201 existing at the position illustrated in FIG. 2B. An image 205 is an image displayed on the display apparatus 202 when the position of the input controller 201 moves to a position 206. The image 205 is a virtual viewpoint image captured by the first virtual camera at the position and orientation that correspond to the input controller 201 existing at the position 206.

Figure 3:
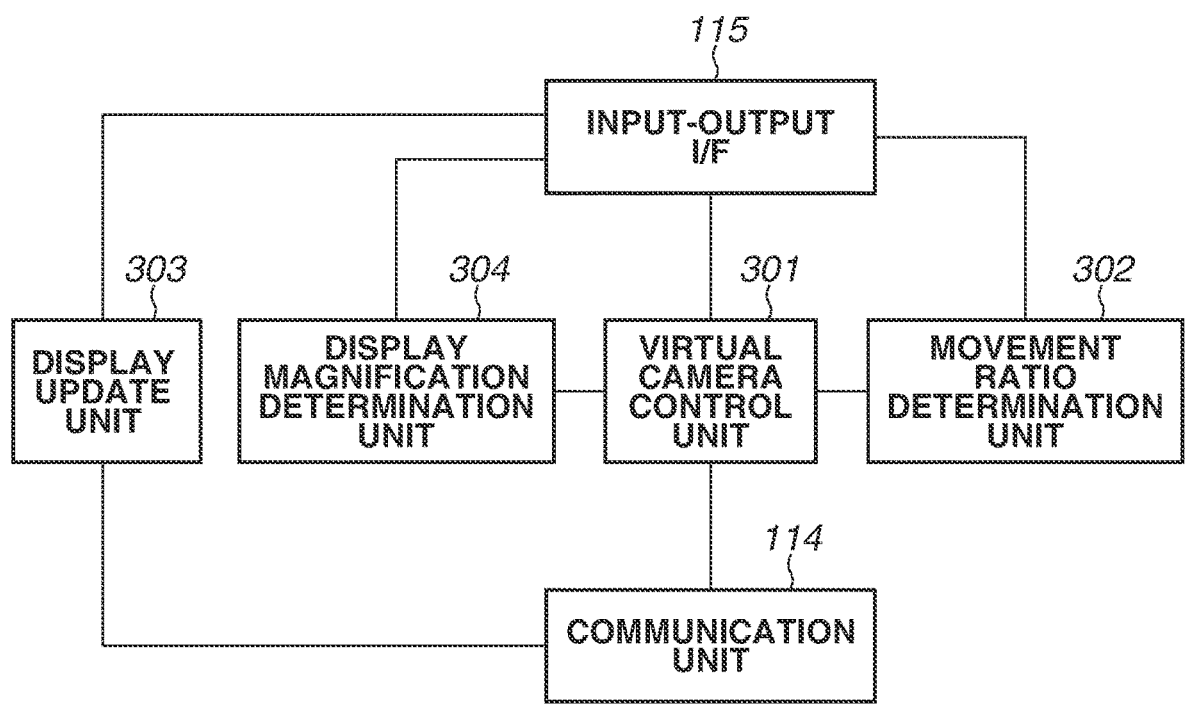
FIG. 3 is a diagram illustrating an example of a functional configuration of an information processing apparatus.

FIG. 3 is a diagram illustrating an example of a functional configuration of the information processing apparatus 103.

The information processing apparatus 103 includes a virtual camera control unit 301, a movement ratio determination unit 302, a display update unit 303, and a display magnification determination unit 304.

If the virtual camera control unit 301 acquires, from the input controller 201, input for controlling the first virtual camera, the virtual camera control unit 301 updates camera parameters of the first virtual camera. The virtual camera control unit 301 acquires, from the input controller 201, information regarding the position and the orientation of the input controller 201 in the real space. Based on the position and the orientation of the input controller 201 in the real space and a movement ratio, the virtual camera control unit 301 obtains a new position and orientation of the first virtual camera in an image space. The virtual camera control unit 301 transmits camera parameters indicating the obtained position and orientation, to the generation server apparatus 102 via the communication unit 114.

If the movement ratio determination unit 302 acquires, from the input controller 201, information regarding a change instruction of a movement ratio (information regarding the selection of the enlargement button 207 or the reduction button 208), the movement ratio determination unit 302 changes the movement ratio. The virtual camera control unit 301 determines the position of the first virtual camera based on the movement ratio. As the movement ratio becomes larger, a movement amount of the first virtual camera with respect to a movement amount of the input controller 201 becomes larger.

The display update unit 303 outputs a virtual viewpoint image received from the generation server apparatus 102 via the communication unit 114, to the display apparatus 202 or the display apparatus 203.

Based on the value of the movement ratio, the display magnification determination unit 304 determines an enlargement ratio of a virtual viewpoint image captured by the second virtual camera that is to be displayed on the display apparatus 203. Hereinafter, the enlargement ratio will be referred to as a display magnification. In the present exemplary embodiment, the display magnification corresponds to a zoom value of a virtual camera that is represented by a focal length of each pixel.

In the present exemplary embodiment, if the position of the second virtual camera is changed, the display magnification determination unit 304 changes a display magnification. The display magnification is an example of a display parameter indicating an enlargement ratio at which a virtual viewpoint image captured by the second virtual camera is to be displayed.

Figure 4:
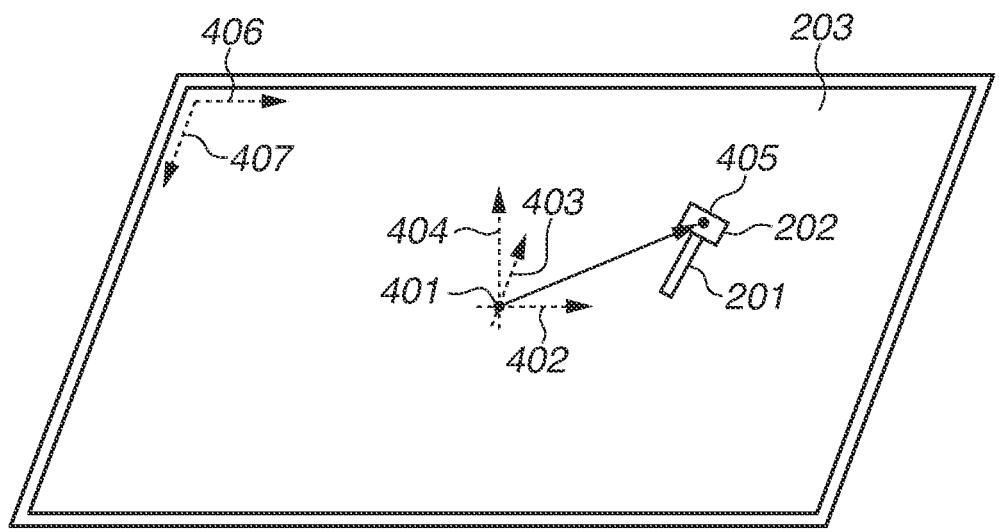
FIG. 4 is a diagram illustrating an example of a coordinate system of a real space and a coordinate system in an image.

A positional relationship between the input controller 201 and the display apparatus 203 will be described with reference to FIG. 4.

In the present exemplary embodiment, a coordinate system including an x-axis 402, a y-axis 403, and a z-axis 404 that are orthogonal to each other, and an origin corresponding to a point 401 is set in the real space. The point 401 is a point being in contact with a screen of the display apparatus 203, and is positioned at the center of a display region of the display apparatus 203. Hereinafter, the coordinate system will be referred to as a real space coordinate system. The position of the input controller 201 is represented by coordinate values in the real space coordinate system (a set of three values including a coordinate value on the x-axis, a coordinate value on the y-axis, and a coordinate value on the z-axis). As information regarding the position of the input controller 201 in the real space, the input controller 201 transmits information regarding the coordinate values to the information processing apparatus 103.

When a center 405 of the display apparatus 202 coincides with the point 401, the input controller 201 returns the coordinate values (0, 0, 0) as information regarding the position of the input controller 201.

In the present exemplary embodiment, an imaginary space serving as an imaging capturing target of a virtual camera will be referred to as an image space. In the image space, a coordinate system including three axes orthogonal to each other is set. Hereinafter, the coordinate system will be referred to as an image space coordinate system.

In the present exemplary embodiment, both of the real space coordinate system and the image space coordinate system are right-handed coordinate systems. Nevertheless, as another example, both of the real space coordinate system and the image space coordinate system may be left-handed coordinate systems.

An axis 406 is an x-axis of an image to be displayed by the display apparatus 203. An axis 407 is a y-axis of an image to be displayed by the display apparatus 203.

FIG. 5 is a flowchart illustrating an example of processing performed by the information processing apparatus 103. The information processing apparatus 103 periodically executes the processing illustrated in FIG. 5.

In step S501, the movement ratio determination unit 302 determines whether a change instruction of a movement ratio (information indicating that the enlargement button 207 or the reduction button 208 has been selected) has been received from the input controller 201. If the movement ratio determination unit 302 determines that a change instruction of a movement ratio has been received (YES in step S501), the processing proceeds to step S502, and if the movement ratio determination unit 302 determines that a change instruction of a movement ratio has not been received (NO in step S501), the processing proceeds to step S504.

In step S502, the movement ratio determination unit 302 updates a movement ratio by updating a value of a variable indicating a movement ratio that is prestored in the RAM 112. A default value of a movement ratio is set to 1.0, More specifically, if the change instruction determined to be received in step S501 is an enlargement instruction of a movement ratio, the movement ratio determination unit 302 increases the value of the movement ratio by a predefined value (e.g., 0.5, 1, 5, 10, etc.). In addition, if the change instruction determined to be received in step S501 is a reduction instruction of a movement ratio, the movement ratio determination unit 302 decreases the value of the movement ratio by a predefined value (e.g., 0.5, 1, 5, 10, etc.).

In addition, the movement ratio determination unit 302 updates a reference position by updating a value of a variable indicating a reference position that is prestored in the RAM 112. The reference position is a position based on which the position of the first virtual camera in the image space coordinate system is determined. In the present exemplary embodiment, a default value of a reference position is set to (0, 0, 0). In the present exemplary embodiment, the movement ratio determination unit 302 obtains an updated reference position using the following formula 1.

$$\beta = \begin{pmatrix} x_i \\ y_i \\ z_i \end{pmatrix} - \alpha \begin{pmatrix} x_r \\ y_r \\ z_r \end{pmatrix} \quad (1)$$

In Formula 1, "β" denotes an updated reference position. In addition, $x_i$, $y_i$, and $z_i$ denote a position of the first virtual camera in the image space coordinate system. In addition, "α" denotes an updated movement ratio. In addition, $x_r$, $y_r$, and $z_r$ denote a position of the input controller 201 in the real space coordinate system.

By updating the reference position using Formula 1, the movement ratio determination unit 302 can maintain the current position of the first virtual camera with respect to the current position of the input controller 201 without change. Thus, the movement ratio determination unit 302 can prevent the position of the first virtual camera from changing despite the intention during the processing in step S505, which will be described below.

In step S503, the display magnification determination unit 304 updates a display magnification using the following formula 2.

$$f = wT/(W\alpha) \quad (2)$$

In Formula 2, "f" denotes an updated display magnification. In addition, "α" denotes a movement ratio. In addition, "w" denotes a width of each pixel of an image captured by the second virtual camera. In addition, "T" denotes a height (position in the z-axis direction) of the second virtual camera in the image space coordinate system. In addition, "W" denotes a width in meters of a display region (screen) of the display apparatus 203. In the present exemplary embodiment, an aspect ratio of the screen of the display apparatus 203 and an aspect ratio of an image captured by a second virtual camera are equal, A default value of a display magnification is (wT)/W.

In step S504, the virtual camera control unit 301 acquires, from the input controller 201, the position and the orientation of the input controller 201 in the real space coordinate system that have been acquired via the position and orientation sensor 211.

In step S505, based on the position and the orientation of the input controller 201 that have been acquired in step S504, the virtual camera control unit 301 obtains camera parameters of the first virtual camera.

The details of the processing in step S505 will now be described with reference to a flowchart in FIG. 6A.

In step S601, the virtual camera control unit 301 multiplies the position of the input controller 201 in the real space coordinate system by a movement ratio.

In step S602, the virtual camera control unit 301 obtains a position by adding a reference position to the result of the processing in step S601, as a position of the first virtual camera in the image space coordinate system. More specifically, the virtual camera control unit 301 obtains a position of the first virtual camera in the image space coordinate system using the following formula 3.

$$\begin{pmatrix} x_i \\ y_i \\ z_i \end{pmatrix} = \alpha \begin{pmatrix} x_r \\ y_r \\ z_r \end{pmatrix} + \beta \quad (3)$$

In Formula 3, "β" denotes a reference position. In addition, $x_i$, $y_i$, and $z_i$ denote a position of the first virtual camera in the image space coordinate system. In addition, "α" denotes a movement ratio. In addition, $x_r$, $y_r$, and $z_r$ denote a position of the input controller 201 in the real space coordinate system. The reference position β is a three-dimensional vector indicating the position in the x-axis, the y-axis, and the z-axis. Elements of the reference position β are denoted by $\beta_x$, $\beta_y$, and $\beta_z$.

In step S603, the virtual camera control unit 301 determines an orientation of the input controller 201 as an orientation of the first virtual camera. Then, the virtual camera control unit 301 determines the position of the first virtual camera that has been obtained in steps S601 to S602, the orientation of the first virtual camera, and a predefined zoom value, as camera parameters of the first virtual camera.

In the present exemplary embodiment, the virtual camera control unit 301 uses a predefined value as a zoom value of the first virtual camera. Nevertheless, as another example, the virtual camera control unit 301 may use a value designated by the user via an input apparatus connected to the input-output I/F 115, as a zoom value of the first virtual camera. Examples of the input apparatus connected to the input-output I/F 115 include the input controller 201, a mouse, and a keyboard.

The description will return to FIG. 5.

In step S506, the virtual camera control unit 301 and the display magnification determination unit 304 obtain camera parameters of the second virtual camera.

The details of the processing in step S506 will now be described with reference to a flowchart in FIG. 6B.

In step S611, the display magnification determination unit 304 determines a position of the second virtual camera based on a reference position. In the present exemplary embodiment, the display magnification determination unit 304 determines the position of the second virtual camera in the image space coordinate system in the following manner. More specifically, the display magnification determination unit 304 determines $\beta_x$ and $\beta_y$ as a coordinate value on the x-axis and a coordinate value on the y-axis of the second virtual camera in the image space coordinate system. Then, the display magnification determination unit 304 determines a predefined value as a coordinate value (T) on the z-axis of the second virtual camera in the image space coordinate system. In other words, the coordinate values of the second virtual camera in the image space coordinate system become $(\beta_x, \beta_y, T)$.

In step S612, the display magnification determination unit 304 acquires a display magnification.

In step S613, the virtual camera control unit 301 determines the position of the second virtual camera that has been calculated in step S611, a predetermined orientation, and the display magnification acquired in step S612, as camera parameters of the second virtual camera. The predetermined orientation is such an orientation that the direction of an optical axis corresponds to a negative direction of the z-axis and a downward direction of an image corresponds to a negative direction of the y-axis. The display magnification acquired in step S612 is used as a zoom value of the second virtual camera.

The description will return to FIG. 5.

In step S507, the virtual camera control unit 301 transmits the camera parameters of the first virtual camera and the camera parameters of the second virtual camera that have been obtained in steps S505 and S506, to the generation server apparatus 102 via the communication unit 114. In this manner, the information processing apparatus 103 controls the movement of the first virtual camera (virtual viewpoint) in accordance with the movement of the input controller 201.

If the generation server apparatus 102 receives the camera parameters transmitted in step S507, the generation server apparatus 102 generates virtual viewpoint images captured by the first virtual camera and the second virtual camera corresponding to the received camera parameters, and transmits the generated virtual viewpoint images to the information processing apparatus 103.

The details of display control processing in which the information processing apparatus 103 displays virtual viewpoint images on the display apparatus 202 and the display apparatus 203 will now be described with reference to a flowchart in FIG. 6C. The information processing apparatus 103 periodically executes the processing illustrated in FIG. 6C.

In step S621, the display update unit 303 receives a virtual viewpoint image captured by the first virtual camera, from the generation server apparatus 102 via the communication unit 114.

In step S622, the display update unit 303 receives a virtual viewpoint image captured by the second virtual camera, from the generation server apparatus 102 via the communication unit 114.

In step S623, by transmitting the virtual viewpoint image captured by the first virtual camera that has been received in step S621, to the display apparatus 202, the display update unit 303 controls the display apparatus 202 to display the virtual viewpoint image.

In step S624, by transmitting the virtual viewpoint image captured by the second virtual camera that has been received in step S622, to the display apparatus 203, the display update unit 303 controls the display apparatus 203 to display the virtual viewpoint image.

An example of a situation in which a movement ratio is changed will be described with reference to FIGS. 7A and 79.

Figure 7A:
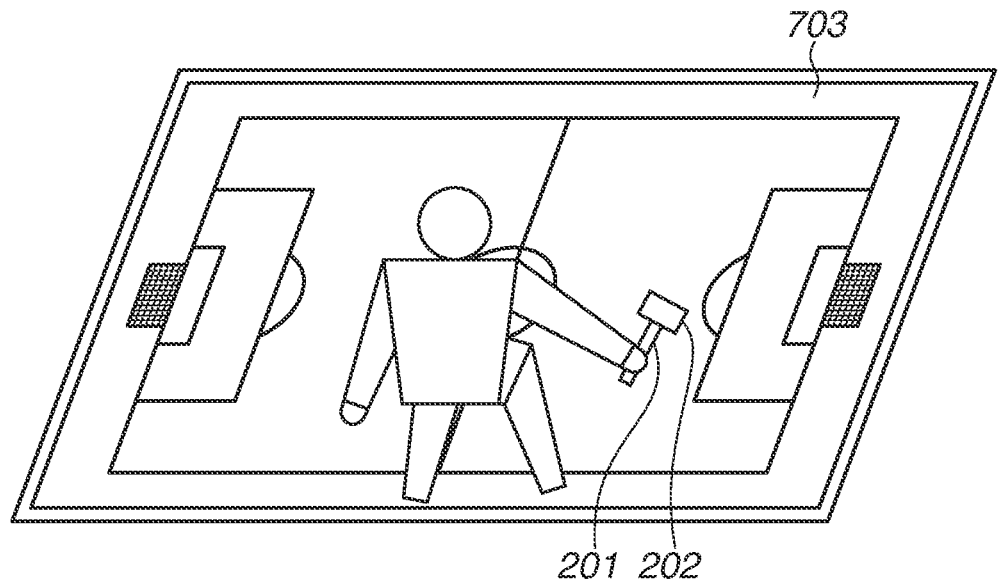
FIGS. 7A and 7B are diagrams illustrating an example of a situation in which a movement ratio is changed.

In the situation illustrated in FIG. 7A, the input controller 201 is positioned at (2.0, −1.0, 0.5) in the real space coordinate system. In the situation illustrated in FIG. 7A, a movement ratio is 20.0. In addition, a reference position is (0.0, 0.0, 0.0). In addition, a height T of the second virtual camera is 20.0. In addition, a width w of an image captured by the second virtual camera is 1920. In addition, a width W of the screen of the display apparatus 203 is 6.4.

At this time, by Formula 2, a display magnification is calculated as (wT)/(Wα)=(1920×20.0)/(6.4×20.0)=300.0.

In the example illustrated in FIG. 7A, in step S505, the virtual camera control unit 301 obtains camera parameters of the first virtual camera in which the position of the first virtual camera in the image space coordinate system is set as (40.0, −20.0, 10.0). Then, in step S507, the virtual camera control unit 301 transmits the camera parameters of the first virtual camera that have been obtained in step S505, to the generation server apparatus 102.

If the display update unit 303 receives, in step S621, a virtual viewpoint image corresponding to the first virtual camera that has been generated by the generation server apparatus 102, in step S623, the display update unit 303 displays the virtual viewpoint image on the display apparatus 202.

In the example illustrated in FIG. 7A, in step S611, the display magnification determination unit 304 obtains (0.0, 0.0, 20.0) as a position of the second virtual camera in the image space coordinate system. Then, in step S613, the virtual camera control unit 301 obtains camera parameters of the second virtual camera using the position and a display magnification of 300,0. Then, in step S507, the virtual camera control unit 301 transmits the obtained camera parameters of the second virtual camera to the generation server apparatus 102.

If the display update unit 303 receives, in step S622, a virtual viewpoint image corresponding to the second virtual camera that has been generated by the generation server apparatus 102, in step S624, the display update unit 303 displays the virtual viewpoint image on the display apparatus 203. An image 703 is a virtual viewpoint image displayed on the display apparatus 203.

Figure 7B:
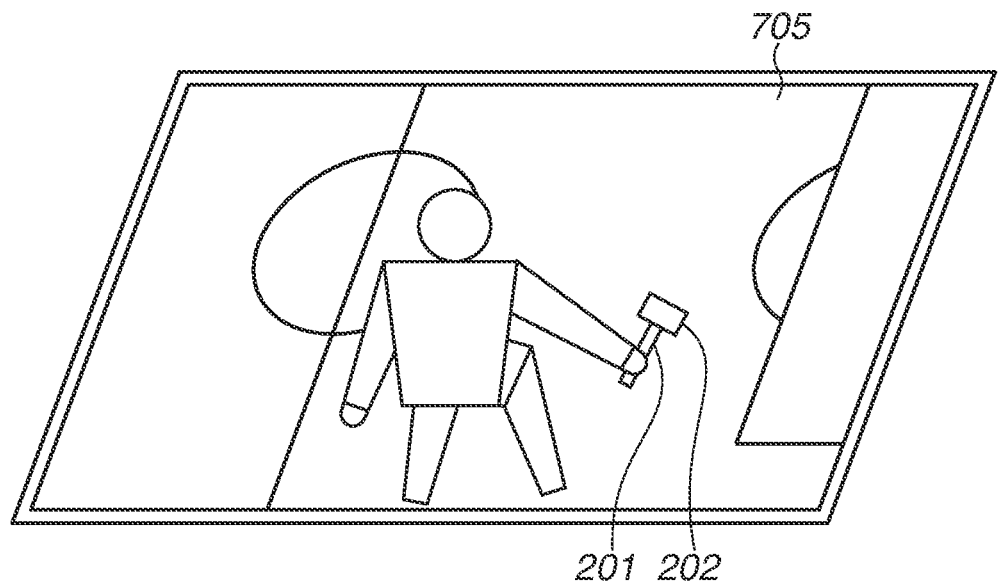

A situation illustrated in FIG. 7B is a situation in which a movement ratio is changed to 10.0 in a state in which the input controller 201 exists at the same position as the situation illustrated in FIG. 7A. At this time, in step S502, the movement ratio determination unit 302 changes a movement ratio to 10.0, and updates a reference position in accordance with the following formula 4.

$$\beta = \begin{pmatrix} x_i \\ y_i \\ z_i \end{pmatrix} - \alpha \begin{pmatrix} x_r \\ y_r \\ z_r \end{pmatrix} = \begin{pmatrix} 40.0 \\ -20.0 \\ 10.0 \end{pmatrix} - 10.0 \times \begin{pmatrix} 2.0 \\ -1.0 \\ 0.5 \end{pmatrix} = \begin{pmatrix} 20.0 \\ -10.0 \\ 5.0 \end{pmatrix} \quad (4)$$

In Formula 4, "β" denotes an updated reference position. In addition, $x_i$, $y_i$, and $z_i$ denote a position of the first virtual camera in the image space coordinate system. In the example illustrated in FIG. 7B, ($x_i$, $y_i$, $z_i$) is (40.0, −20.0, 10.0). In addition, "α" denotes a changed movement ratio, and is set to 10.0. In addition, $x_r$, $y_r$, and $z_r$ denote a position of the input controller 201 in the real space coordinate system, and is (2.0, −1.0, 0.5).

By multiplying (2.0, −1.0, 0.5) denoting the position of the first virtual camera in the image space coordinate system, by the movement ratio of 10.0, and adding the reference position of (20.0, −10.0. 5.0), (40.0, −20.0, 10.0) is obtained. This indicates that the position of the first virtual camera remains unchanged even if the movement ratio is changed. Thus, an image displayed on the display apparatus 202 before the movement ratio is changed and an image displayed on the display apparatus 202 after the movement ratio is changed are the same image.

The display magnification determination unit 304 updates a display magnification based on the updated movement ratio. By Formula 2, the display magnification is obtained as (wT)/(Wα)=(1920×20.0)/(6.4×10.0)=600.0.

In step S611, the display magnification determination unit 304 obtains the position of the second virtual camera in the image space coordinate system as ($\beta_x$, $\beta_y$, T)=(20.0, −10.0, 20.0) using "β" and "T". The virtual camera control unit 301 obtains camera parameters of the second virtual camera using the position and the updated display magnification. An image 705 is a virtual viewpoint image captured by the second virtual camera arranged at the position. The display magnification is changed to 600.0 from 300.0 set before the update, and a more telephoto image in a narrower range is captured. Thus, the image 705 displayed by the display apparatus 203 is displayed in an enlarged manner as compared with the image 703.

Figure 8:
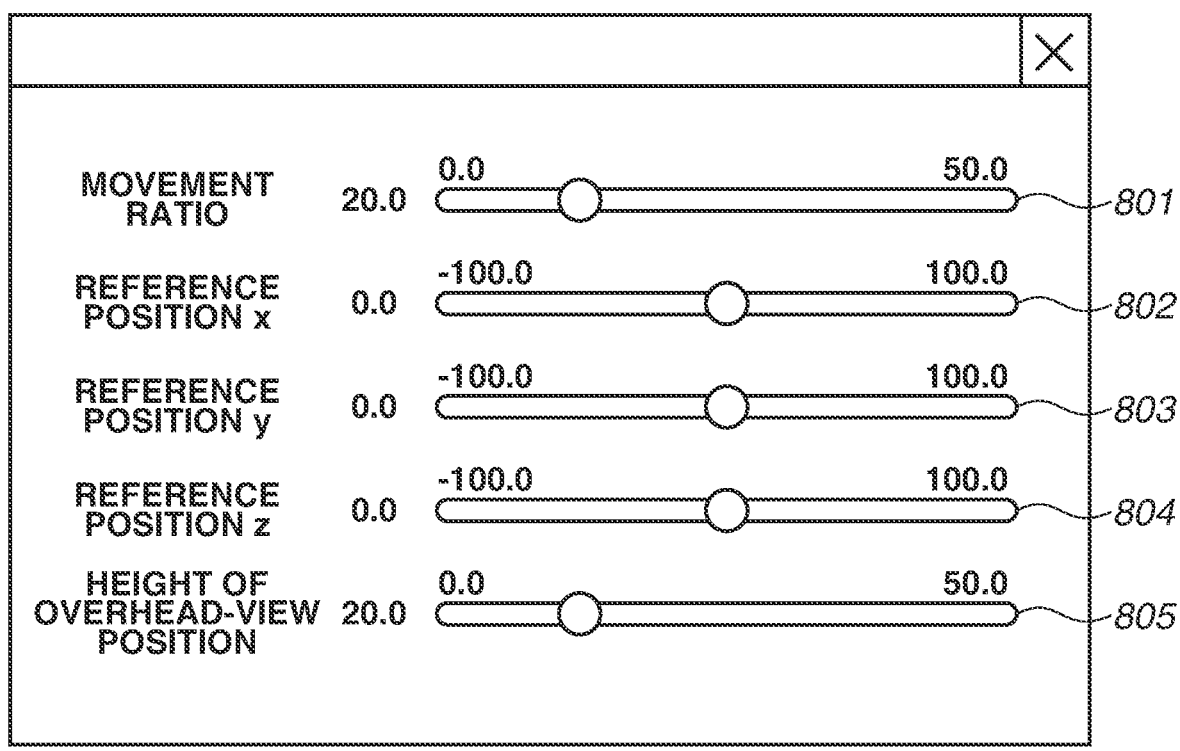
FIG. 8 is a diagram illustrating an example of a graphical user interface (GUI)

FIG. 8 is a diagram illustrating an example of a graphical user interface (GUI) used for issuing a change instruction of a movement ratio, a reference position, or a height T of the second virtual camera. Hereinafter, the GUI will be referred to as an operation GUI. The display update unit 303 displays the operation GUI on a display unit (e.g., the display apparatus 202, the display apparatus 203, another display apparatus, etc.). The user performs an operation on the operation GUI displayed on the display unit, using an input apparatus (e.g., the input controller 201, a mouse, a touch panel, etc.) connected to the input-output I/F 115. An operation bar 801 is a bar object used for displaying and changing a movement ratio. Operation bars 802, 803, and 801 are bar objects used for displaying and changing respective values of a reference position on the x-axis, the y-axis, and the z-axis. An operation bar 805 is a bar object used for displaying and changing a value of a height T of the second virtual camera.

The information processing apparatus 103 receives the operation performed on the operation GUI, via the input-output I/F 115, and updates the movement ratio, the reference position, or the height T in accordance with the received operation.

As described above, through the processing in the present exemplary embodiment, the image processing system 10 can receive the designation of a movement ratio to be used in controlling a virtual camera (virtual viewpoint) desired to be controlled, and control the virtual viewpoint more appropriately using the movement ratio determined in accordance with the received designation.

Modified Example 1

In the present exemplary embodiment, a coordinate value on the z-axis of a reference position is made variable. Nevertheless, as another example, a value on the z-axis of the reference position β may be always set to 0 irrespective of a movement ratio. In this case, when a movement ratio is changed, the height of the first virtual camera changes even though the input controller 201 is not moved. Nevertheless, by keeping a value on the z-axis of the reference position β always at 0, the height of the first virtual camera can be always set to 0 when the input controller 201 is on the display apparatus 203 in the real space coordinate system.

Modified Example 2

In the present exemplary embodiment, a common movement ratio α is set for all coordinate values on the x-axis, the y-axis, and the z-axis. Nevertheless, as another example, the information processing apparatus 103 may use individual movement ratios for the respective coordinate values on the x-axis, the y-axis, and the z-axis.

Modified Example 3

The movement ratio determination unit 302 may set an upper limit and a lower limit of a change range of a movement ratio. The movement ratio determination unit 302 may determine an upper limit and a lower limit of a movement ratio based on a range of a virtual viewpoint image that can be generated by the generation server apparatus 102.

For example, it is assumed that a virtual viewpoint image cannot be created when a virtual camera exists outside a space A predefined in the image space coordinate system. At this time, the movement ratio determination unit 302 may determine an upper limit of a movement ratio so as to prevent the second display apparatus 203 from displaying the outside of the space A. In addition, the movement ratio determination unit 302 may determine the space A being a range of a virtual viewpoint image that can be generated by the generation server apparatus 102, based on camera parameters (e.g., position and orientation, focal length, etc.) of a physical camera included in the imaging system 101.

In addition, the movement ratio determination unit 302 may determine an upper limit and a lower limit of a movement ratio based on a region in the image space coordinate system in which a subject can exist.

For example, if the position of a subject (e.g., sport athlete, ball, etc.) at each time is identified in the image space coordinate system, a space B in the image space coordinate system that encompasses the position can be obtained. The movement ratio determination unit 302 may determine an upper limit of a movement ratio so as to prevent the display apparatus 203 from displaying a region distant from the space B by a fixed distance or more. If an upper limit of a movement ratio is determined, the information processing apparatus 103 controls the movement ratio not to exceed the upper limit, in addition, if a lower limit of a movement ratio is determined, the information processing apparatus 103 controls the movement ratio not to fall below the lower limit.

Modified Example 4

In the present exemplary embodiment, the movement ratio determination unit 302 determines a movement ratio and a reference position based on input from the user. Nevertheless, as another example, the movement ratio determination unit 302 may determine a movement ratio and a reference position irrespective of the input from the user.

For example, the movement ratio determination unit 302 may obtain the maximum, movement ratio and reference position at which the outside of the space A is not displayed, and use the obtained movement ratio and reference position.

Modified Example 5

In the present exemplary embodiment, a predefined value is used as the height T being a value on the z-axis of the second virtual camera. Nevertheless, as another example, the information processing apparatus 103 may determine a value of the height T based on input from the user that is performed via the operation GUI. The information processing apparatus 103 may determine a value of the height T in accordance with an imaging situation irrespective of the input from the user.

If a value of the height T is minute, an image captured by the second virtual camera becomes a wide-angle image and a peripheral portion is distorted. If a value of the height T is too large, when the height of a subject changes, a size in an image does not change, and the change in the height of the subject is not noticed. For example, when a ball is thrown up highly, if the ball appears in a large size in an image captured by the second virtual camera, the user can notice the change in the height of the ball. Nevertheless, if a value of the height T is too large, because the change in the size of the ball in the image captured by the second virtual camera is small, the user cannot notice the change in the height of the ball.

Modified Example 6

In the present exemplary embodiment, the display apparatus 203 is a display installed on a floor surface. Nevertheless, as another example, the display apparatus 203 may be an apparatus including a screen on the floor surface, and a projection apparatus (projector) that projects an image onto the screen. The advantage of the use of such an apparatus lies in that cost for embedding a display in a floor surface is unnecessary. In addition, the advantage of the use of a display installed on a floor surface lies in that an image to be projected is not shaded by the user.

Modified Example 7

In the present exemplary embodiment, parameters of a virtual camera are made controllable in accordance with an operation performed via an input apparatus connected to the input-output I/F 115. Nevertheless, as another example, only a part of the parameters of a virtual camera may be made controllable in accordance with an operation performed via an input apparatus connected to the input-output I/F 115. For example, only the position and the orientation of a virtual viewpoint may be made controllable. In this case, the virtual camera control unit 301 controls the position and the orientation of the virtual viewpoint. In this case, because a zoom cannot be controlled, the image processing system 10 cannot change a display magnification by changing a zoom value of the second virtual camera, but can change a display magnification by changing a value on the z-axis of the second virtual camera.

In the first exemplary embodiment, a display region of the display apparatus 203 is a floor surface. In addition, an image captured from right above in the image space coordinate system toward a downward direction is displayed on the display apparatus 203. In some cases, the user cannot identify a surrounding situation of the first virtual camera based on such an image. For example, in the case of capturing an image of a match of sport, an image captured from right above shows only a head top portion and shoulders of a player, and a uniform number cannot be seen. It is therefore difficult to distinguish between players in some cases.

In view of the foregoing, in a second exemplary embodiment, a display apparatus 203 is a wearable display worn by the user, and an image processing system 10 displays, on the display apparatus 203, an image visible by the user when the user is assumed to be inside an image space. The user can thereby operate the position and the orientation of the first virtual camera in a state of being immersed in the image space.

The image processing system 10 of the present exemplary embodiment is different from that of the first exemplary embodiment in that the display apparatus 203 is a wearable display.

The display apparatus 203 of the present exemplary embodiment includes a position and orientation sensor that detects the position and the orientation of the display apparatus 203. The display apparatus 203 detects the position and the orientation of the display apparatus 203 in the real space coordinate system via the position and orientation sensor, and transmits information regarding the detected position and orientation to the information processing apparatus 103. The display apparatus 203 is worn by the user. Thus, the position and the orientation of the display apparatus 203 indicate the position and the direction of a viewpoint of the user.

The input controller 201, the display apparatus 202, and the display apparatus 203 in the present exemplary embodiment will be described with reference to FIG. 9. The user holds the input controller 201, and wears the display apparatus 203 being a wearable display, on the user's face.

While checking an image of the first virtual camera via the display apparatus 202 attached to the input controller 201, the user can check a surrounding state of the first virtual camera in the image space based on an image of the second virtual camera that is displayed in front of the user's eye by the display apparatus 203.

Figure 9:
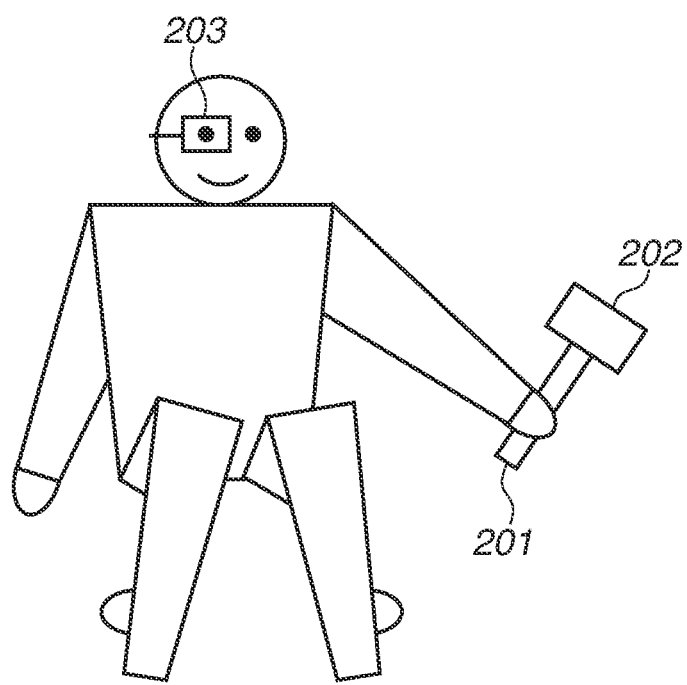
FIG. 9 is a diagram illustrating an example of a usage situation of various devices.

FIG. 10A is a diagram illustrating an example of images displayed on the display apparatus 202 and the display apparatus 203 in the state illustrated in FIG. 9. An image 1001 is an image displayed on the display apparatus 202 in the situation illustrated in FIG. 9. An image 1002 is an image displayed on the display apparatus 203 in the situation illustrated in FIG. 9, at the same timing as the image 1001.

A viewpoint of the user (a virtual viewpoint of the second virtual camera) with respect to a subject in an image space is at a position more distant than that of the input controller 201 (a virtual viewpoint of the first virtual camera). Thus, the image 1002 displayed on the display apparatus 203 is an image of a region wider than the image 1001 displayed on the display apparatus 202.

The processing in the present exemplary embodiment is different from that in the first exemplary embodiment in processing performed in step S506.

The details of the processing performed in step S506 of the present exemplary embodiment will be described with reference to FIG. 10B. In the present exemplary embodiment, unlike the first exemplary embodiment, the image processing system 10 changes a display magnification of an image of the second virtual camera by changing the position of the second virtual camera instead of changing a focal length.

In step S1011, the display magnification determination unit 304 acquires the position and the orientation of the display apparatus 203 in the real space coordinate system that have been detected via the position and orientation sensor of the display apparatus 203.

In step S1012, the display magnification determination unit 304 multiplies the position of the display apparatus 203 that has been acquired in step S1011, by a movement ratio.

In step S1013, the display magnification determination unit 304 obtains a position by adding a reference position to the result of the processing in step S1012, as a position of the second virtual camera in the image space coordinate system.

More specifically, the display magnification determination unit 304 obtains a position of the second virtual camera using the following formula 5.

$$\begin{pmatrix} x_i \\ y_i \\ z_i \end{pmatrix} = \alpha \begin{pmatrix} x_q \\ y_q \\ z_q \end{pmatrix} + \beta \quad (5)$$

In Formula 5, "β" denotes a reference position. In addition, $x_i$, $y_i$, and $z_i$ denote a position of the first virtual camera in the image space coordinate system. In addition, "α" denotes a changed movement ratio. In addition, $x_q$, $y_q$, and $z_q$ denote a position of the second display apparatus in the real space coordinate system. In step S1014, the virtual camera control unit 301 determines a zoom value of the second virtual camera based on a physical size of the display apparatus 203, and a distance from the eye of the user to the display apparatus 203. The virtual camera control unit 301 determines the position of the second virtual camera that has been obtained in step S1013, the orientation of the display apparatus 203, and the determined zoom value, as camera parameters of the second virtual camera.

As described above, through the processing in the present exemplary embodiment, the image processing system 10 can enable the user to control the first virtual camera (virtual viewpoint) in the state of being immersed in an image space.

According to the above-described exemplary embodiments, a virtual viewpoint related to a virtual viewpoint image can be controlled more easily.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-034685, filed Feb. 27, 2019, which is hereby incorporated by reference herein in its entirety.

What is claimed is:

1. An information processing apparatus comprising:
one or more processors functioning by executing instructions stored in one or more memories as the following units:
a setting unit configured to set a movement parameter which indicates a ratio of a movement amount of a virtual viewpoint in a virtual space to a movement amount in a real space of an input apparatus used for moving a virtual viewpoint corresponding to a virtual viewpoint image, and which is changeable by a user operation; and
a movement control unit configured to move, in accordance with a movement of the input apparatus, the virtual viewpoint by a movement amount in the virtual space that is determined based on the movement parameter set by the setting unit and a movement amount in the real space of the input apparatus.

2. The information processing apparatus according to claim 1, wherein the one or more processors further function as the following units: a display control unit configured to display a first virtual viewpoint image that is based on the virtual viewpoint moved by the movement control unit, on a display unit.

3. The information processing apparatus according to claim 2, wherein the one or more processors further function as the following units: a determination unit configured to determine a display parameter indicating an enlargement ratio at which a second virtual viewpoint image displayed for movement control of a virtual viewpoint corresponding to the first virtual viewpoint image that is based on an operation of the input apparatus is to be displayed, based on the movement parameter set by the setting unit.

4. The information processing apparatus according to claim 3, wherein the determination unit determines the display parameter based on the movement parameter set by the setting unit, and a position of a virtual viewpoint corresponding to the second virtual viewpoint image.

5. The information processing apparatus according to claim 3, wherein the determination unit determines the display parameter based on the movement parameter set by the setting unit, and a focal length of a virtual camera corresponding to a virtual viewpoint corresponding to the second virtual viewpoint image.

6. The information processing apparatus according to claim 3, wherein the display control unit displays the second virtual viewpoint image on another display unit based on the display parameter determined by the determination unit.

7. The information processing apparatus according to claim 6, wherein the one or more processors further function as the following units: a control unit configured to control a position and an orientation of a virtual viewpoint corresponding to the second virtual viewpoint image, based on a position and an orientation of the other display unit.

8. The information processing apparatus according to claim 1, wherein the setting unit changes the movement parameter based on input performed on the input apparatus in accordance with a user operation.

9. The information processing apparatus according to claim 1, wherein the setting unit determines the movement parameter based on at least one or more of a range in which a virtual viewpoint is movable, a position and an orientation of an imaging apparatus that captures an image used for generation of a virtual viewpoint image, and a focal length of the imaging apparatus.

10. The information processing apparatus according to claim 1, wherein the setting unit determines at least one of an upper limit or a lower limit of the movement parameter based on any one or more of a range in which a virtual viewpoint is movable, a position and an orientation of an imaging apparatus that captures an image used for generation of a virtual viewpoint image, and a focal length of the imaging apparatus, and sets the movement parameter based on the determination.

11. An information processing method comprising:
setting a movement parameter which indicates a ratio of a movement amount of a virtual viewpoint in a virtual space to a movement amount in a real space of an input apparatus used for moving a virtual viewpoint corresponding to a virtual viewpoint image, and which is changeable by a user operation; and
moving, in accordance with a movement of the input apparatus, the virtual viewpoint by a movement amount in the virtual space that is determined based on the set movement parameter and a movement amount in the real space of the input apparatus.

12. The information processing method according to claim 11, wherein a first virtual viewpoint image that is based on the virtual viewpoint moved in accordance with a movement of the input apparatus is displayed on a display unit.

13. The information processing method according to claim 12, wherein a display parameter indicating an enlargement ratio at which a second virtual viewpoint image displayed for movement control of a virtual viewpoint corresponding to the first virtual viewpoint image that is based on an operation of the input apparatus is to be displayed is determined based on the set movement parameter.

14. A non-transitory storage medium storing a program for causing a computer to execute an information processing method, the information processing method comprising:
  setting a movement parameter which indicates a ratio of a movement amount of a virtual viewpoint in a virtual space to a movement amount in a real space of an input apparatus used for moving a virtual viewpoint corresponding to a virtual viewpoint image, and which is changeable by a user operation; and
  moving, in accordance with a movement of the input apparatus, the virtual viewpoint by a movement amount in the virtual space that is determined based on the set movement parameter and a movement amount in the real space of the input apparatus.

\* \* \* \* \*